July 8, 1952 R. J. MURPHY 2,602,693
SLIDING CLOSURE
Filed Nov. 24, 1948

INVENTOR.
R. J. MURPHY
BY
A. Yates Dowell
ATTORNEY

Patented July 8, 1952

2,602,693

UNITED STATES PATENT OFFICE 2,602,693

SLIDING CLOSURE

Richard J. Murphy, Peabody, Mass.

Application November 24, 1948, Serial No. 61,750

3 Claims. (Cl. 296—137)

This invention relates to covers and more particularly to devices for covering the otherwise open top and rear body portions of a truck and the like. For the transporting of fluent materials such as coal, sand, gravel and the like, and also for certain cargoes such as garbage and rubbish, there is an increasing need and demand that protection be afforded in order to prevent loss and scattering of the materials enroute. In numerous localities ordinances have been passed requiring vehicles transporting certain materials, including the above, to be covered.

Furthermore, it is oftentimes desirable or necessary to cover vehicles for other reasons including those of protecting the cargo from the weather, theft and the like.

In the past special purpose trucks have been provided for hauling objectionable substances, such as garbage, but these have been relatively expensive and inasmuch as their use is limited many organizations and localities have not employed the same but rather have used trucks adapted for more general purposes and usages. In many instances general purpose trucks adapted to be covered by bows and canvas have been employed where it has been necessary to protect the cargo. However, the bow and canvas type of cover is difficult to install and remove, requires two or more to handle, and does not provide as secure and adequate a cover as is sometimes desired.

Accordingly it is an object of the present invention to provide a cover for a vehicle constructed to overcome the above-mentioned disadvantages.

Another object of the invention is to provide a cover for a vehicle or other body which can be easily attached thereto and remain as a relatively permanent part or removed for other use.

A further object of the invention is the provision of a cover member for a vehicle which is easily adjustable from open to closed position, as well as one which is lightweight, durable, and inexpensive to manufacture.

Another object of the present invention is the provision of a cover or closure for closing an opening of a chamber regardless of whether that opening is in a horizontal, a vertical, or any other position.

Figure 1:
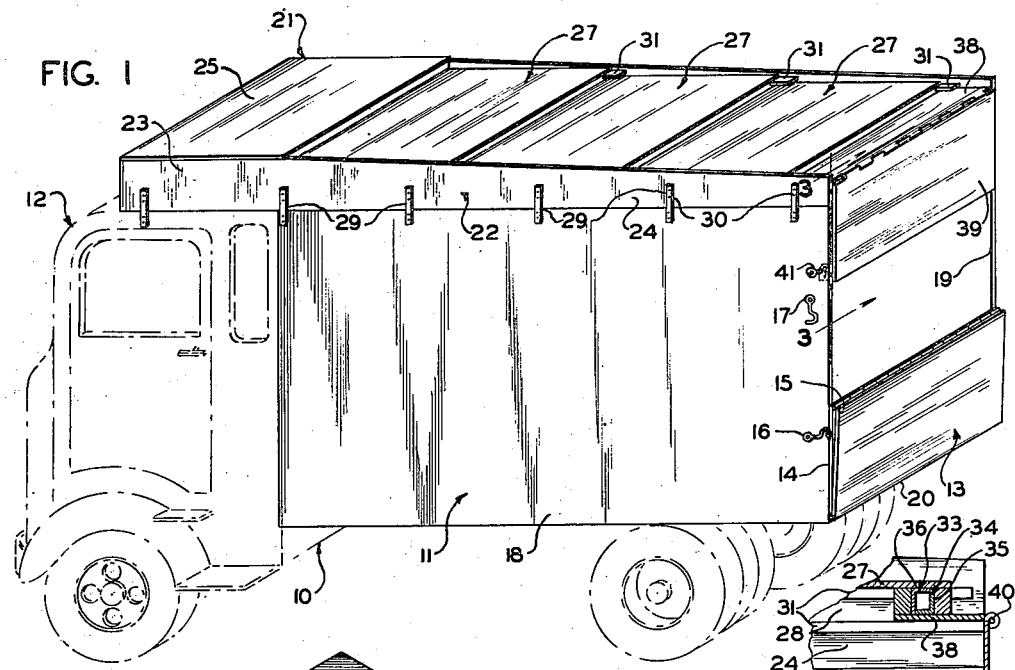
Figures 2, 3:
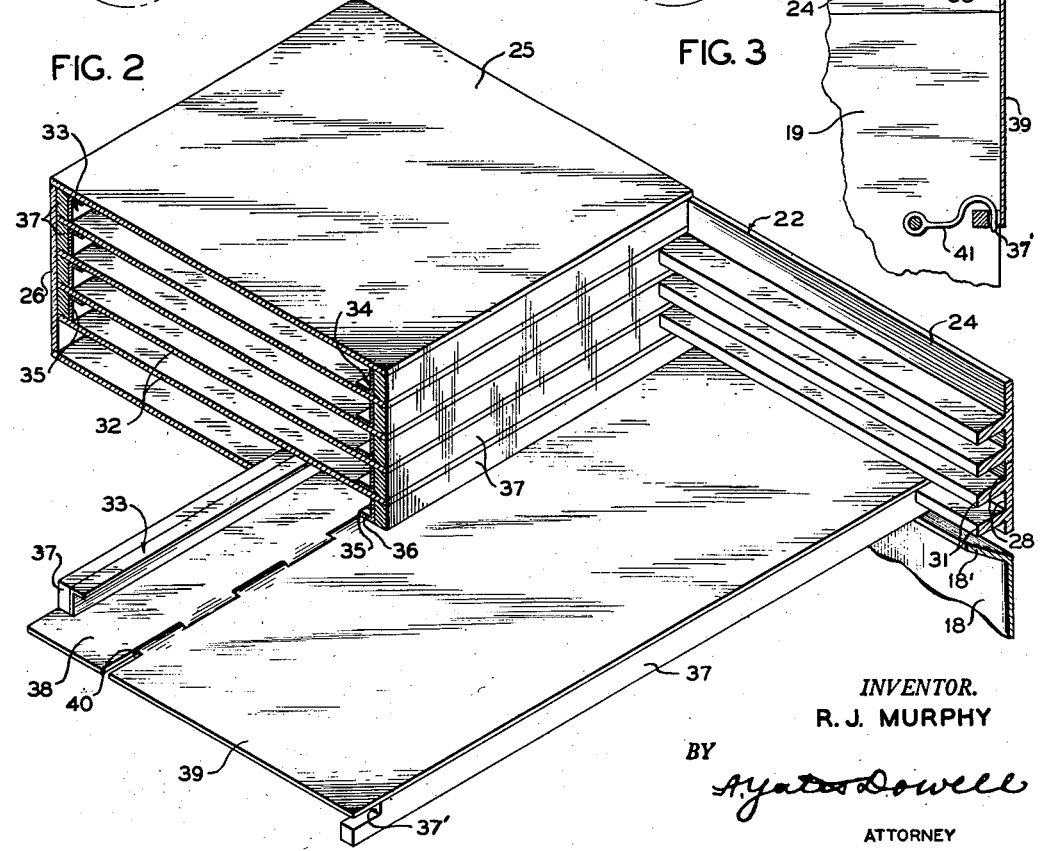

These and other objects of the invention will be apparent from the following description taken in conjunction with the accompanying drawings, wherein:

Fig. 1 is a perspective of a truck body with a cover constructed in accordance with the present invention;

Fig. 2, a perspective of the cover partly in section illustrating the nesting of the slidable members and its application to a modified truck body;

Fig. 3, a section taken on the line 3—3 of Fig. 1.

Referring to the drawings, a conventional truck 10, illustrated in phantom, has a load carrying body 11 and a cab 12. The body 11 includes sides 18 and 19 and a floor 20. The truck is also provided with a double tail-gate 13 including a lower section 14 and an upper section 15 pivotally secured to the lower section. The lower section is pivotally secured to the floor of the truck at the rear edge, and connecting members 16 and 17 are attached to the body of the truck for holding the tail-gate in extended position.

In accordance with the present invention a truck cover 21 is provided for closing the top and rear portion of the truck body 11. The cover may be in various lengths for closing all or a section of a particular vehicle body and may be adapted for different body types as well as for other transportation and storage receptacles.

The cover 21 includes side members 22, each of which has a rectangular end portion 23 integral with a trapezoidal body portion 24. The portion 23 has a top member 25 and an end member 26, and is adapted to be positioned over the cab 12 of the truck, as shown in the drawing. The upper boundary or edge of the trapezoidal members 23 are adapted to be closed by a plurality of movable sheet members 27 which may be housed within the rectangular member 23 when it is desired to uncover the body of the truck.

For the purpose of supporting the slidable sheet members 27 the side members 22 are provided with a plurality of grooves 28 which may be of varying lengths in accordance with the position occupied by the sheet member slidable in the particular groove when in position covering the truck body. For example, the lowermost groove extends the entire length of the sides in order that the lowermost sheet member may be positioned at the rearmost position on the truck body. The sheet next above the lowermost need extend only to a position where its rearmost portion is in substantially the same position as the foremost portion of the next lower sheet in order to achieve continuity of the cover. Similarly, the other members likewise extend a lesser degree toward the rear of the truck and therefore their supporting grooves are correspondingly shorter. By constructing the cover in this manner the top of the truck appears to slope downwardly toward the rear which provides a streamlined appearance to an otherwise square truck body.

For attaching the side members 22 to the truck body suitable bands 29 may be employed and fasteners 30 secured to the truck and the side members.

The preferred form of the side members 22, illustrated in the drawings, has ledges or projections 31 extending substantially at right angles thereto for forming the grooves 28 and supporting the sheet members 27. It is contemplated that the projecting members 31 may be integral with the remainder of the side members and that the entire side may be formed by extrusion or the like in order to provide a simple and inexpensive member. The invention however is not limited to this construction but contemplates other means well known in the art such as the use of angle iron members, one leg of which is attached to the upright side member and the other of which projects therefrom to provide a support.

The construction of the slidable sheet members 27 is best illustrated in Fig. 2. Each of the members is comprised of an elongated flat, substantially rectangular sheet 32 having projections or engaging means 33 and 34, which when the sheet is in position on a vehicle are at their forward and rear sides respectively. In the assembled position the projecting members 33 extend upwardly from the plate to which they are attached and the members 34 extend downwardly in order that the projections of the adjacent sheets will engage each other when the sheets are extended as shown in Fig. 1. In other words when any sheet is moved toward the rear of the truck the engagement projecting upwardly from its forward end will engage the member projecting downwardly from the rearward end of the sheet next above the sheet being moved.

The angular portions 33 and 34 each includes a leg 35 projecting outwardly substantially at right angles to the sheet to which it is attached and a leg 36 at substantially right angles to the leg 35. A block or supporting member 37 is secured to the leg 35 of the angular members and to a portion of the sheet in order to add rigidity and strength to the sheet and to strengthen the joint between the sheet and the angular member. The angular member and block combination extends across each of the sheets except for a short distance at each end in order to leave sufficient space for the edge of the sheet to slide in the groove which is provided for it. The members 37 form bars that extend from one edge of the sheet to the other. The angular members 34 which extend downwardly from the sheets and the blocks secured thereto are provided with slots or recesses 37' for receiving the projections 31 on which the sheets rest. By means of this the sheet is restrained from lateral movement between the grooves 28 at the extremities to which the lower angular member 34 is attached. The other extremity of the sheet members to which the angular member 33 is attached is restrained from lateral movement by reason of its contact or close proximity to the shelf above.

The upper extremities of the walls 18 and 19 of the receptacle are inclined inwardly and upwardly under the side members as shown at 18' in Fig. 2 whereby liquid deposited on the sheets and flowing off the sides thereof toward the side members is deflected by the inclined wall extremities away from the interior of the receptacle.

As the top 25 of the rectangular section 23 remains stationary no groove is provided for it. However, an angular portion 34 extends downwardly from the rear thereof to engage the angular portion 33 extending upwardly from the next lower section.

It is apparent from the construction described above that the sheets are adapted to be superimposed or nest within the housing, as seen in Fig. 2, or to be extended as in Fig. 1 to cover the interior of the truck.

The lowermost sheet 27 is divided into sections 38 and 39 joined by a hinge 40. By this provision the section 39 is adapted to extend down from the top of the truck of a portion of the end thereof to meet the upper section 15 of the double tail-gate in order to completely close the end. Although the lowermost section is shown as comprised of only two sections and as being used with a truck having a straight end section it is apparent that more sections may be used if desired to cover all or only a portion of the end of a vehicle, and for vehicles having other than straight end profiles.

When the cover is in the position shown in Fig. 1 the end of the lowermost member 39 is adapted to be secured by means of a fastener 41 attached to the truck body.

Although the sheets are preferably flat with angle iron members attached thereto, the invention also contemplates the use of sheet members with which the projecting members are integral. In this latter instance the projecting parts may be struck or otherwise formed from the sheets.

In Fig. 2, a modified form of truck body is shown, in which the upper extremities are provided with inwardly inclined portions 18' in order that rainwater and the like deposited on the sheets and flowing around the sides will be deflected outside the truck body.

The sheets are preferably formed of relatively lightweight material such as aluminum or tin but other material may obviously be used.

Although the invention has been described as being used on a roof opening it will be apparent that the closure structure is suitable for closing a wall opening regardless of the position thereof and the sliding closure may be used as a partition. The panels may be slidable in any suitable direction to close the opening with which the closure is used.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A cover for an opening comprising a pair of side members arranged in substantially parallel spaced relation, each of said side members being provided with substantially parallel ledges on the inner face thereof forming grooves therebetween, and sheet members having substantially parallel side edges slidably mounted in corresponding grooves of said side members, each sheet member having a bar extending upwardly from the forward edge thereof and a bar extending downwardly from the rear edge thereof and coextensive therewith, the rear bar of one sheet being engageable with the forward bar of the sheet therebelow whereby when the lower sheet is moved rearwardly the sheets thereabove are sequentially moved rearwardly as the contiguous bars engage each other, the bar at the rear edge being provided with a recess at each end to receive the ledge below the sheet attached to said bar and the portion of the bar below the recess being engageable with the undersurface of the ledge for retaining the rear end of the sheet on said ledge.

2. A cover for an opening comprising a pair of side members arranged in substantially parallel spaced relation, each of said side members being provided with substantially parallel ledges on the inner face thereof forming grooves therebetween, and sheet members having substantially parallel side edges slidably mounted in corresponding grooves of said side members, each sheet member having a bar extending upwardly from the forward edge thereof and a bar extending downwardly from the rear edge thereof and coextensive therewith, the rear bar of one sheet being engageable with the forward bar of the sheet therebelow whereby when the lower sheet is moved rearwardly the sheets thereabove are sequentially moved rearwardly as the contiguous bars engage each other, the bar at the rear edge being provided with a recess at each end to receive the ledge therebelow and the portion of the bar below the recess being engageable in the groove therebelow for retaining the rear end of the sheet on said ledge, the bottom sheet member having a plurality of sections hingedly connected together intermediate the ends thereof whereby at least one section may serve as a partial closure for an end of the opening.

3. A cover for an opening comprising a pair of side members arranged in substantially parallel spaced relation, each of said side members being provided with substantially parallel ledges on the inner face thereof forming grooves therebetween, and sheet members having substantially parallel side edges slidably mounted in corresponding grooves of said side members, each sheet member having a bar extending upwardly from the forward edge thereof and a bar extending downwardly from the rear edge thereof and coextensive therewith, the rear bar of one sheet being engageable with the forward bar of the sheet therebelow whereby when the lower sheet is moved rearwardly the sheets thereabove are sequentially moved rearwardly as the contiguous bars engage each other, the bar at the rear edge being provided with a recess at each end to receive the ledge below the sheet attached to said bar and the portion of the bar below the recess being engageable with the undersurface of the ledge for retaining the rear end of the sheet on said ledge, each of said bars having a portion spaced from the sheet and extending toward the other end of the sheet for interengagement with the cooperating bar on the next adjacent sheet.

RICHARD J. MURPHY.

REFERENCES CITED

The following references are of record in the file of this patent:

UNITED STATES PATENTS

| Number | Name | Date |
| --- | --- | --- |
| 337,831 | Good et al. | Mar. 16, 1886 |

FOREIGN PATENTS

| Number | Country | Date |
| --- | --- | --- |
| 11,823 | Great Britain | Aug. 8, 1896 |
| 291,829 | Great Britain | June 7, 1928 |
| 349,172 | Great Britain | May 28, 1931 |
| 360,160 | Great Britain | Nov. 5, 1931 |